United States Patent [19]

Shiraishi et al.

[11] Patent Number: 5,172,319
[45] Date of Patent: Dec. 15, 1992

[54] DRIVE WHEEL SLIP CONTROL SYSTEM FOR VEHICLE

[75] Inventors: Shuji Shiraishi; Osamo Yamamoto; Takashi Nishihara; Yoshimitsu Akuta, all of Saitama, Japan

[73] Assignee: Honda Giken Kogyo Kabushiki Kaisha, Tokyo, Japan

[21] Appl. No.: 611,570

[22] Filed: Nov. 13, 1990

[30] Foreign Application Priority Data

Nov. 13, 1989 [JP] Japan .................. 1-294476
Mar. 30, 1990 [JP] Japan .................. 2-87019

[51] Int. Cl.⁵ .............................. B60T 8/32
[52] U.S. Cl. .................. 364/426.03; 180/197
[58] Field of Search ............ 364/426.01, 426.03; 180/197; 303/97

[56] References Cited

U.S. PATENT DOCUMENTS

| | | | |
|---|---|---|---|
| 4,762,196 | 8/1988 | Harada et al. | 180/197 |
| 4,884,651 | 12/1989 | Harada et al. | 180/197 |
| 4,947,332 | 8/1990 | Ghoneim | 364/426.03 |
| 5,004,064 | 4/1991 | Tezuka et al. | 180/197 |
| 5,090,511 | 2/1992 | Kabasin | 180/197 |

Primary Examiner—Thomas G. Black
Attorney, Agent, or Firm—Armstrong & Kubovcik

[57] ABSTRACT

In a control system wherein slippage of a vehicle drive wheel is detected and when the slip is excessively large, an engine output or drive wheel torque is reduced, there are provided means for calculating the grip force of the drive wheel and further means for changing the reduction amount of engine output or drive wheel torque, or the reduction speed, or the reduction characteristic dependent on a signal from the grip force calculating means. This enables a sporty travel of a vehicle.

10 Claims, 12 Drawing Sheets

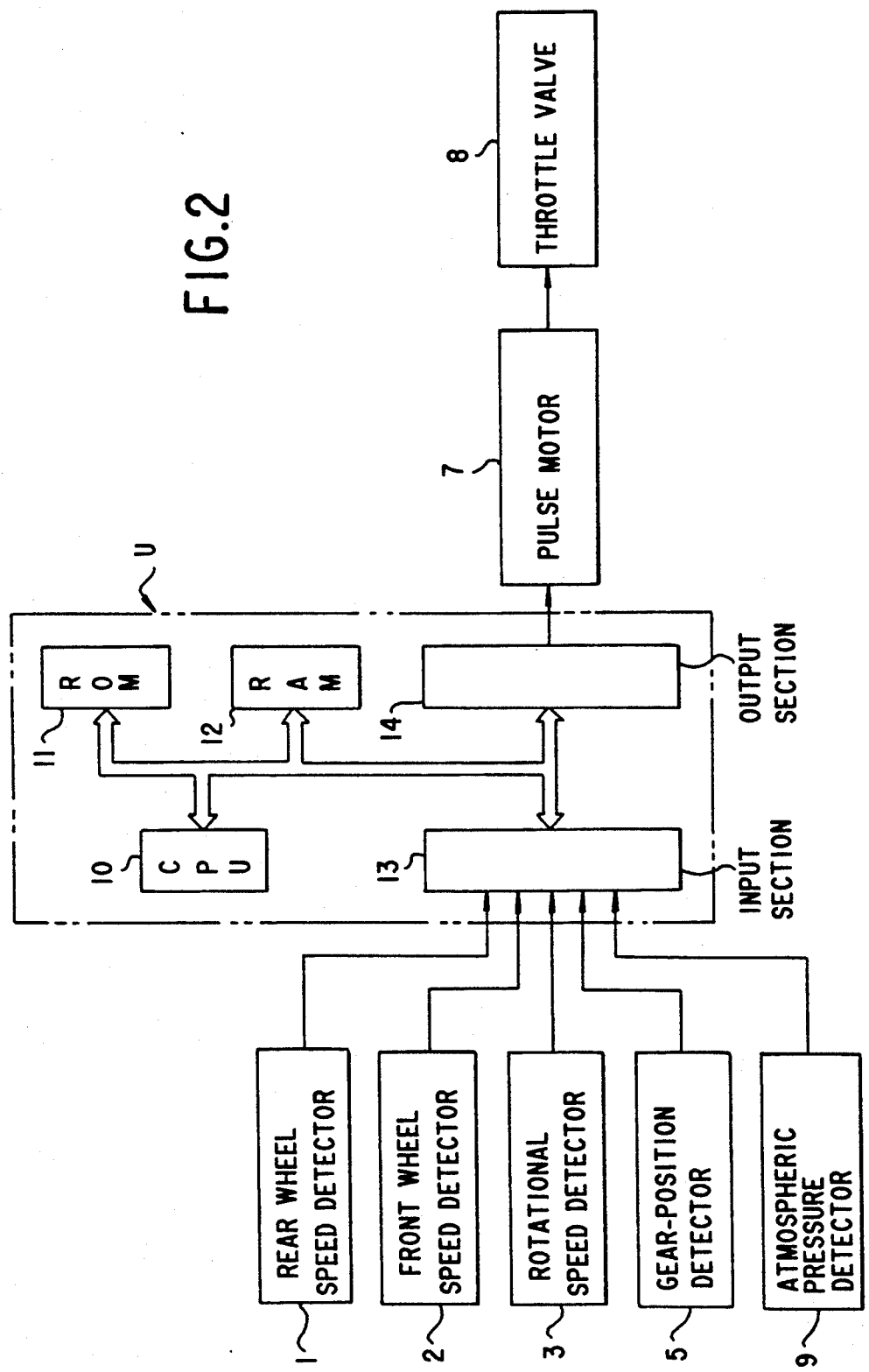

DRIVE WHEEL SLIP CONTROL SYSTEM FOR VEHICLE

BACKGROUND OF THE INVENTION

1. Field of the Invention

The field of the invention is a drive wheel slip control system for a vehicle which operates to prevent generation of an excessive slip in a drive wheel.

2. Description of the Prior Art

Conventionally, as such a drive wheel slip control system for a vehicle, of the type having means to reduce torque of the drive wheel when the slippage of the drive wheel becomes excessively large, there has been proposed an arrangement wherein the reference value for obtaining an appropriate slip rate of the drive wheel is changed dependent on the friction coefficient of a road surface which is estimated from a longitudinal acceleration of the vehicle (for example, see Japanese Patent Publication Kokoku No. 20051/83) and an arrangement wherein the yaw movement of the vehicle is corrected when detecting that the yaw movement has been deviated from the steering characteristic desired by a driver of the vehicle (see Japanese Patent Application Publication Kokai No. 219828/88).

However, in case of the former arrangement, the friction coefficient of road surface is merely estimated from the longitudinal acceleration of a vehicle and the estimated friction coefficient is used to change the reference speed for the wheel, so that if the wheel is accelerated during travelling on a high grip road and turning around a limiting lateral force of a tire, for example, the longitudinal acceleration of the vehicle cannot be high and the road surface may erroneously be judged to be a low grip one to select a lower reference value, which undesirably leads to an excessive suppression of the drive wheel slip. In addition, as the limiting lateral force of the tire is originally at a low level when the road grip force is low and particularly in a rear wheel drive vehicle any small variation in the drive force (an increase thereof) easily places the vehicle in a fishtailing condition, it is desired to keep the reference slip value for the vehicle when starting in an accelerated manner at a lower level. However, when the road condition is judged to be a high grip, it is required to raise the reference value promptly; otherwise deterioration in the accelerating performance may occur.

In the latter arrangement, control is effected to lower the reference speed under a specific road surface-tire condition which has been obtained by experiments from a deviation between a reference yaw rate and an actual yaw rate caused during turning of a vehicle which requires a tire to keep its lateral force. Accordingly, there occur such inconveniences under a high grip condition that the drive wheel slip is suppressed excessively to deteriorate the accelerating performance, that a drift travel in a power-on state is disturbed, and that the rise in the drive force after the vehicle has passed a corner is delayed. As a result, it is difficult to perform a sporty travel and utilize the accelerating characteristic inherent to the vehicle.

SUMMARY OF THE INVENTION

A first object of the invention is to provide a drive wheel slip control system which operates to inhibit excessive suppression of a drive wheel slip in a high grip condition, thereby enabling a sporty travel and making the steering feel better.

To achieve the above object, according to a first feature of the invention, there is provided a drive wheel slip control system for a vehicle, comprising a slipping condition detector for detecting a slipping condition of a drive wheel, an engine output reduction amount calculating means for calculating an amount of reduction of an engine output based on a signal outputted from the slipping condition detector, an engine output reduction means for reducing the engine output based on a signal from the engine output reduction amount calculating means, a grip force calculating means for calculating a grip force for the drive wheel, and a correction amount determining means for correcting said amount of reduction of the engine output calculated at the engine output reduction amount calculating means on the basis of an output signal from the grip force calculating means.

Owing to the above first feature, dependent on the grip force of the drive wheel, the correction amount determining means operates to correct the amount of reduction of engine output obtained at the engine output reduction amount calculating means. This correction may be in the form of correction of a target drive wheel speed or of a minimum engine output, for example. Accordingly, when the grip force is large, the amount of reduction of engine output to be effected during traction control can be reduced, as a result of which a drift travel becomes possible making the change of drift amount linear, thereby enhancing the steering feeling.

According to a second feature of the invention, there is provided a drive wheel slip control system for a vehicle, comprising a slipping condition detector for detecting a slipping condition of a drive wheel, an engine output reduction amount calculating means for calculating an amount of reduction of an engine output based on a signal outputted from the slipping condition detector, an engine output reduction means for reducing the engine output based on a signal from the engine output reduction amount calculating means, a grip force calculating means for calculating a grip force for the drive wheel, and an engine output reduction speed determining means for reducing a speed of the reduction of said engine output performed by said engine output reduction means on the basis of an increase in the level of a signal outputted from the grip force calculating means.

Owing to the second feature, dependent on the grip force of the drive wheel, the engine output reduction speed determining means operates to lower the engine output reduction speed outputted from the engine output reduction means. Thereby, when the grip force is large, the speed of reduction of engine output to be effected during traction control can be reduced and so a drift travelling is made possible. Moreover, since the amount of drift changes linearly, the steering feeling is improved.

A second object of the invention is to detect a change in tire and road surface accurately and effectively to suppress fishtailing movements of a vehicle in a low grip condition without sacrificing an accelerating performance to be exhibited in a high grip condition.

In order to achieve the second object, according to a third feature of the invention, there is provided a drive wheel slip control system for a vehicle, comprising a reference value setting means for setting a reference value for slippage of a drive wheel which allows an appropriate slip condition, a drive wheel torque reduction means for reducing a torque of the drive wheel when the slip condition of the drive wheel exceeds the reference value, a grip force calculating means for calculating a grip force for the drive wheel, and a reference value correcting means for correcting said reference value dependent on an output from the grip force calculating means.

Owing to the third feature, during vehicle travel, the grip force calculating means operates and calculates the grip force of a tire and the reference value correcting means increases the reference value for slippage of the drive wheels as obtained at the reference value setting means. Due to this, the reference value increases as the tire gripping force rises, enabling a power-drift travelling on a dry road surface and a swift rise in the drive force after a vehicle has passed a corner. Even when a tire of a different grip force is mounted, a reference value appropriate for that tire is provided so that the slip control for drive wheels can be performed in a most suitable manner at all times.

Furthermore, a third object of the invention is to assume the grip condition between the road surface and the tire as a total grip force and give a control responsiveness optimum for the current grip force to drive wheels in view of the fact that the delay in control operation using reference values for the slip condition of the drive wheels is differentiated by the grip force.

To achieve the third object, according to a fourth feature of the invention, there is provided a drive wheel slip control system for a vehicle, comprising a reference value setting means for setting a reference value for slippage of a drive wheel which allows an appropriate slip condition, a drive wheel torque reduction means for reducing a torque of the drive wheel when the slip condition of the drive wheel exceeds the reference value, a grip force calculating means for calculating a grip force for the drive wheel, and a drive wheel torque reduction characteristic change means for changing a relationship of the amount of reduction of drive wheel torque effected by the drive wheel torque reduction means with respect to the slipping condition dependent on the grip force obtained at the grip force calculating means.

Owing to this fourth feature, the tire grip force is calculated during vehicle travel by the grip force calculating means and in response to the grip force thus obtained the control speed for the drive wheel torque is changed, whereby the drive wheel controlling characteristic can be optimized to meet any variation in the road surface condition or in kinds of tire.

BRIEF DESCRIPTION OF THE DRAWINGS

FIGS. 1 to 3A show a first embodiment according to this invention, in which FIG. 1 is a view showing a schematic arrangement of a vehicle equipped with a system according to this embodiment, FIG. 2 is a block diagram showing an electronic control unit and FIG. 3A is a block diagram showing the circuit arrangement of the electronic control unit;

FIGS. 3B and 4 show a second embodiment, in which FIG. 3B is a block diagram showing the circuit arrangement of an electronic control unit and FIG. 4 is a graph explaining an operation of the unit;

FIGS. 5 to 8 show a third embodiment wherein FIG. 5 is a block diagram showing the circuit arrangement of an electronic control unit, FIG. 6 is a flow chart showing the content of control of the unit, FIG. 7 is a graph showing the relationship between the throttle opening degree and the engine torque and FIG. 8 is a graph showing the operation of an engine output reduction speed change means;

FIGS. 11 to 13 show a fourth embodiment wherein FIG. 11 is a block diagram, FIG. 12 is a graph showing the relationship between a total grip force and an amount of correction of a target reference speed and FIG. 13 is a schematic view showing the control procedure.

DESCRIPTION OF PREFERRED EMBODIMENTS

Some embodiments according to the invention will be explained hereinafter with reference to the accompanying drawings.

Figure 1:
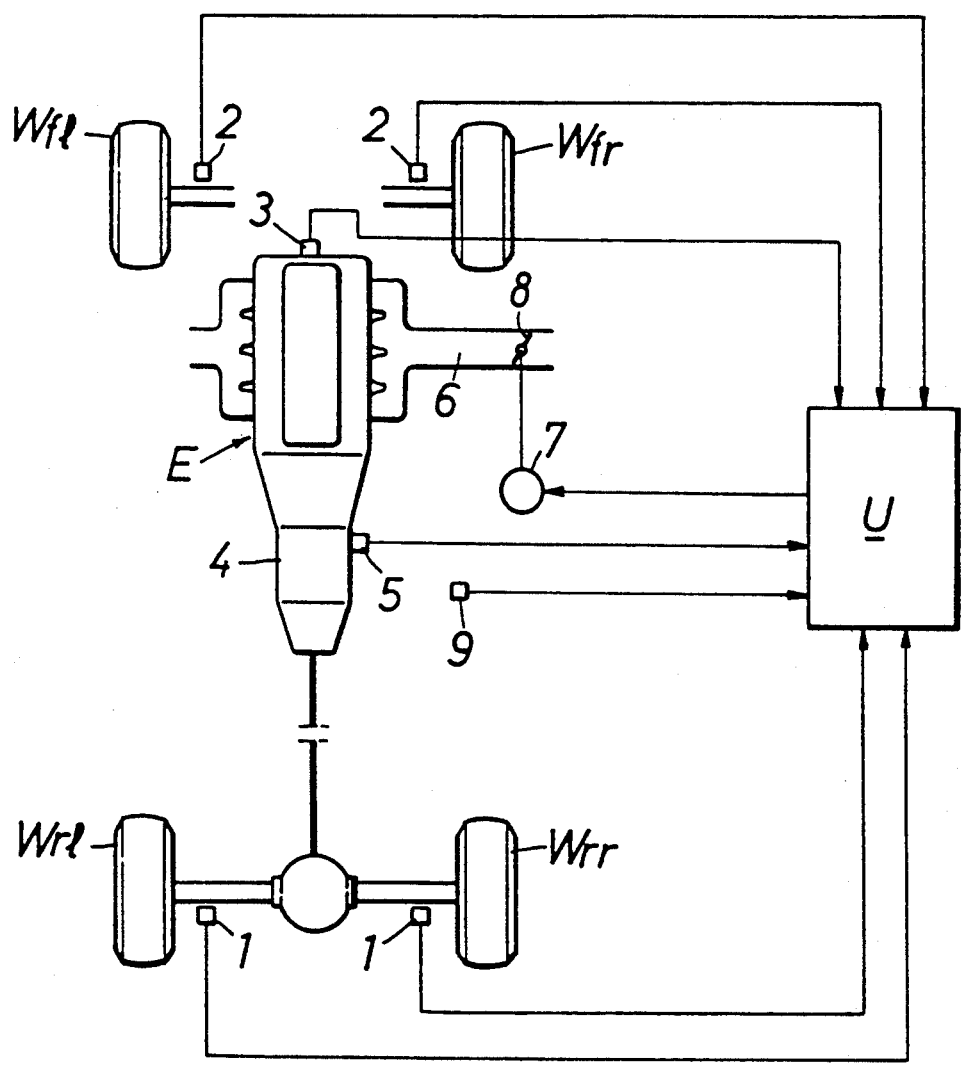

FIGS. 1 to 3A show a first embodiment. FIG. 1 is the view showing a schematic arrangement of a rear wheel drive vehicle to which a control system according to this embodiment is mounted. The vehicle is equipped with left and right rear wheels Wrl and Wrr serving as a pair of drive wheels which are driven by an engine E and left and right front wheels Wfl and Wfr as a pair of follower wheels. Rear wheel speed detectors 1 are provided on the respective rear wheels Wrl, Wrr and front wheel speed detectors 2 are provided on the respective front wheels Wfl, Wfr in order to detect their rotational speeds. The engine E is equipped thereon with a rotational speed detector 3 in the form of a gear and an electromagnetic pickup for detecting the rotational speed Ne of a crankshaft of the engine and a gear-position detector 5 for detecting the gear position of a transmission thereof. In an intake passage 6 of the engine is provided a throttle valve 8 which is connected to and driven for opening and closing operations by a pulse motor 7. An atmospheric pressure detector 9 is provided adjacent the engine E for detecting an atmospheric pressure $P_A$. These components, rear wheel speed detectors 1, front wheel speed detectors 2, rotational speed detector 3, gear-position detector 5, pulse motor 7 and atmospheric pressure detector 9 are connected to an electronic control unit U which is formed as a microcomputer.

FIG. 2 shows the electronic control unit U which is constructed to drive the throttle valve 8 via the pulse motor 7 by subjecting detected signals inputted from respective detectors to certain operations and processings in accordance with a control program. The electronic control unit U comprises a central processing device (CPU) 10 for carrying out the said operations and processings, a read-only-memory (ROM) 11 which stores therein data such as the afore-mentioned control program and various maps, a random-access-memory (RAM) 12 which temporarily memorizes detected signals of the respective detectors and results of processings, an input section 13 which is connected with the respective detectors, that is, rear wheel speed detectors 1, front wheel speed detectors 2, rotational speed detector 3, gear-position detector 5 and atmospheric pressure detector 9, and an output section 14 which is connected to the pulse motor 7. The electronic control unit U controls the central processing device 10 so as to perform operations and processings of the detected signals inputted through the input section 13, data stored in the read-only-memory 11 and the like in accordance with the control program which will be described later and at a final stage drives the pulse motor 7 through the output section 14. Thereby, the throttle valve 8 is controlled toward a closed position to change the output torque of the engine E, which results in controlling of the drive wheel torque to a value optimum for suppressing excessive slip caused at the drive or rear wheels Wrl, Wrr of the vehicle.

Figure 3A:
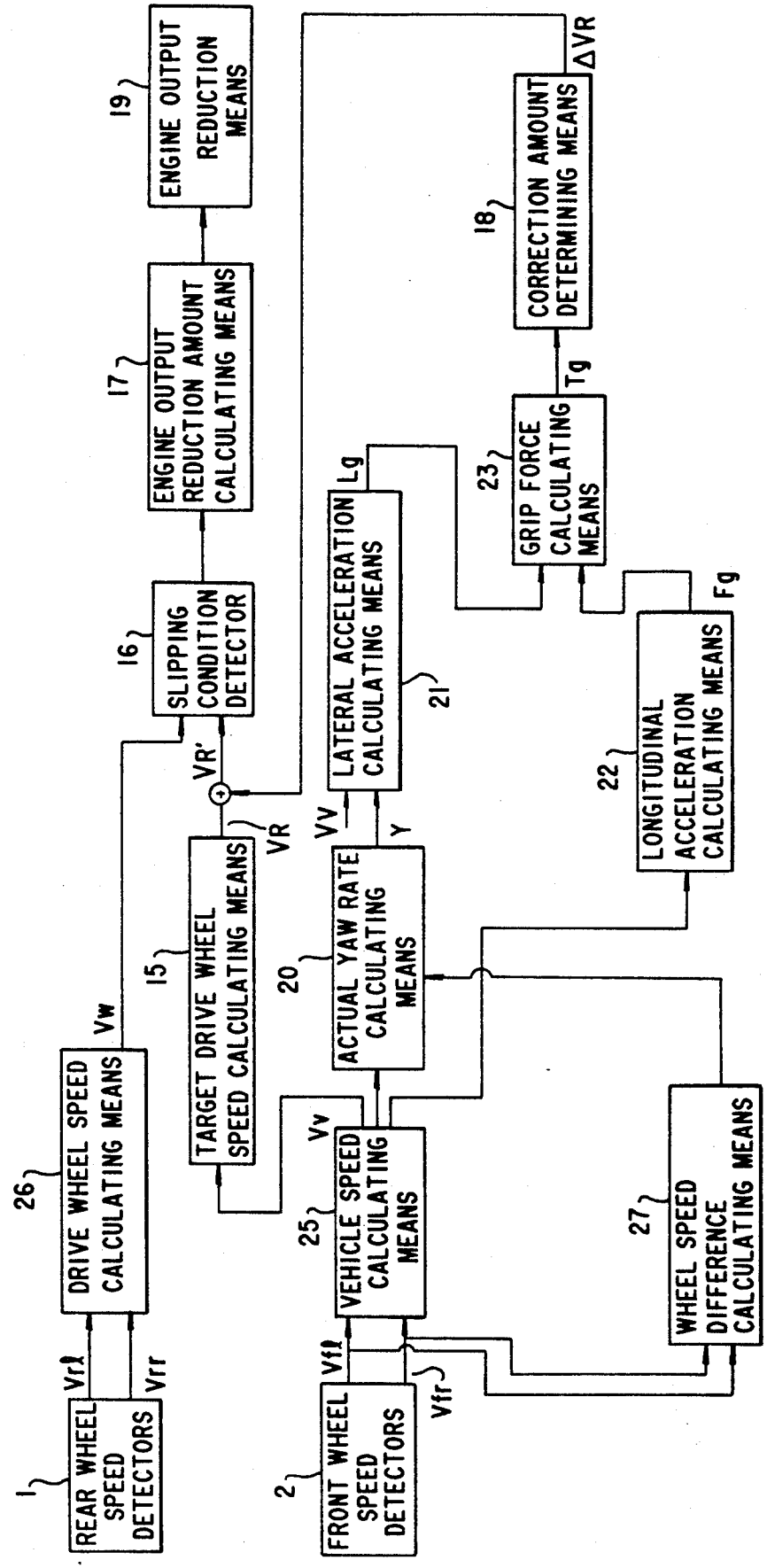

FIG. 3A shows a block diagram of a circuit arrangement of the electronic control unit U. Left and right rear wheel speeds Vrl and Vrr detected by the rear wheel speed detectors 1 are inputted to a drive wheel speed calculating means 26 at which a drive wheel speed Vw is obtained through calculation of an average value of the left and right rear wheel speeds Vrl and Vrr. On the other hand, left and right front wheel speeds Vfl and Vfr detected by the front wheel speed detectors 2 are inputted to a vehicle speed calculating means 25 and are subjected to an operation thereat for obtaining a vehicle speed Vv as an average value of the front wheel speeds Vfl and Vfr.

The left and right front wheel speeds Vfl and Vfr detected by the front wheel speed detectors 2 are also inputted to a wheel speed difference calculating means 27 at which the difference Vfl−Vfr between the left and right front wheels is calculated. At an actual yaw rate calculating means 20, the wheel speed difference Vfl−Vfr is passed through a low-pass filter in order to eliminate any influence on the front wheel speeds Vfl and Vfr which may be caused by resonance components in the oscillation of a suspension system, that is, the speed difference is subjected to filtering to leave components in a low frequency band (for example, not more than 10 Hz) for use with control of vehicle movements, thereby calculating an actual yaw rate Y.

The vehicle speed Vv obtained at the vehicle speed calculating means 25 is inputted to a target drive wheel speed calculating means 15 at which the vehicle speed Vv is multiplied by a constant $K_R$ according to the following equation (1) to determine a target drive wheel speed $V_R$ which will give an appropriate slipping condition to the drive wheels Wrl, Wrr:

$$V_R = K_R \times V_v \tag{1}$$

The target drive wheel speed $V_R$ and the drive wheel speed Vw outputted from the drive wheel speed calculating means 26 are inputted to a slipping condition detector 16 and this detector 16 detects the slipping condition of the drive wheels Wrl, Wrr based on a deviation of the actual drive wheel speed Vw from the target drive wheel speed $V_R$. If the drive wheel speed Vw exceeds the target drive wheel speed $V_R$ and a slipping condition is detected thereby, the deviation between the drive wheel speed Vw and the target drive wheel speed $V_R$, an integrated value of that deviation and a differentiated value of the drive wheel speed Vw are multiplied by corresponding control gains, respectively, to obtain an amount of control for the throttle valve 8 at an engine output reduction amount calculating means 17, that is, the throttle valve 8 is subjected to a PID feedback control so as to reduce the output of the engine E for the purpose of bringing the drive wheel speed Vw into convergence toward the target drive wheel speed $V_R$. The amount of control obtained serves to determine a target throttle opening degree by correcting in accordance with the afore-mentioned PID feedback control the initial throttle opening degree derived from an engine output torque corresponding to a torque level which is capable of being transmitted between a tire and a road surface and which has been read out of a data table on the basis of the output Tg from a grip force calculating means 23, for example, to be described later. Output signal of the engine output reduction amount calculating means 17 is inputted to an engine output reduction means 19 at which the said amount of control is fed back to the throttle valve 8 via the pulse motor 7.

The vehicle speed Vv obtained at the vehicle speed calculating means 25 is also inputted to a longitudinal acceleration calculating means 22 and this means 22 operates to obtain a longitudinal acceleration Fg of the vehicle according to the following equations (2) and (3) based on a hysteresis $\dot{V}$ of differentiated values of the vehicle speed Vv as well as a hysteresis of the vehicle speed Vv:

$$\dot{V}(k) = \tag{2}$$
$$\sigma 1 \times \dot{V}(k-1) + \sigma 2 \times \dot{V}(k-2) + \sigma 3 \times \dot{V}(k-3) +$$
$$\tau 0 \times V v(k) + \tau 1 \times V v(k-1) + \tau 2 \times V v(k-2) +$$
$$\tau 3 \times V v(k-3)$$
$$Fg = K_1 \times \dot{V}(k) \tag{3}$$

Here, δ1, δ2, δ3, τ0, τ1, τ2, τ3 and $K_1$ are constants and subscripts k, k−1, k−2 and k−3 represent the present value, the previous value, the next previous value and the second next previous value, respectively.

On the other hand, the vehicle speed Vv obtained at the vehicle speed calculating means 25 and the actual yaw rate Y obtained at the actual yaw rate calculating means 20 are inputted to a lateral acceleration calculating means 21 at which a lateral acceleration Lg of the vehicle is calculated according to the following equation (4):

$$Lg = K_2 \times V v \times Y \tag{4}$$

Here $K_2$ is a constant.

The longitudinal acceleration Fg and lateral acceleration Lg of the vehicle as have been obtained in the aforementioned manner are inputted to the grip force calculating means 23 at which a total grip force Tg of the drive wheels is calculated in terms of acceleration based on the mean square of longitudinal and lateral accelerations Fg and Lg according to the following equation (5):

$$Tg = \sqrt{Fg^2 + Lg^2} \tag{5}$$

The total grip force Tg thus obtained is inputted to a correction amount determining means 18 at which an amount of reference value correction $\Delta V_R$ is determined according to the magnitude of the total grip force Tg. The reference value correction amount $\Delta V_R$ is added to the target drive wheel speed $V_R$ obtained at the target drive wheel speed calculating means 15 thereby to modify the target speed $V_R$ into a modified target drive wheel speed $V_R$, in an increasing direction.

$$V_{R'} = V_R + \Delta V_R$$

The above-described reference value correction amount $\Delta V_R$ can be set, for example, such that it becomes 0 when the total grip force Tg is below a lower limit and assumes a constant value (for example, 5 km/h) when the total grip force Tg rises above an upper limit, and it increases linearly in a range between the lower and upper limits.

Accordingly, if a modified target drive wheel speed $V_{R'}$ is determined by the correction amount determining means 18, the engine output reduction means 19 operates to drive the pulse motor 7 to control the throttle valve 8 toward its closed position for convergence of the drive wheel speed Vw toward the modified target drive wheel speed $V_{R'}$. In this operation, even if the drive wheels are showing a large slipping condition in the driving direction, since the target drive wheel speed $V_R$ has been modified to an increased value in response to an increase in the total grip force Tg, the deviation between the actual drive wheel speed Vw and the modified target drive wheel speed $V_{R'}$, stays at a small level, leading to a reduced amount of closure of the throttle valve 8. As a result, when the total grip force Tg assumes a large value, that is, when the grip force of the drive wheels Wrl, Wrr or the coefficient of friction of a road surface is large, the drive wheels are permitted to slip in the driving direction thereby to reduce a critical or limiting lateral force of the tire, enabling a sporty travelling of the vehicle.

Figure 3B:
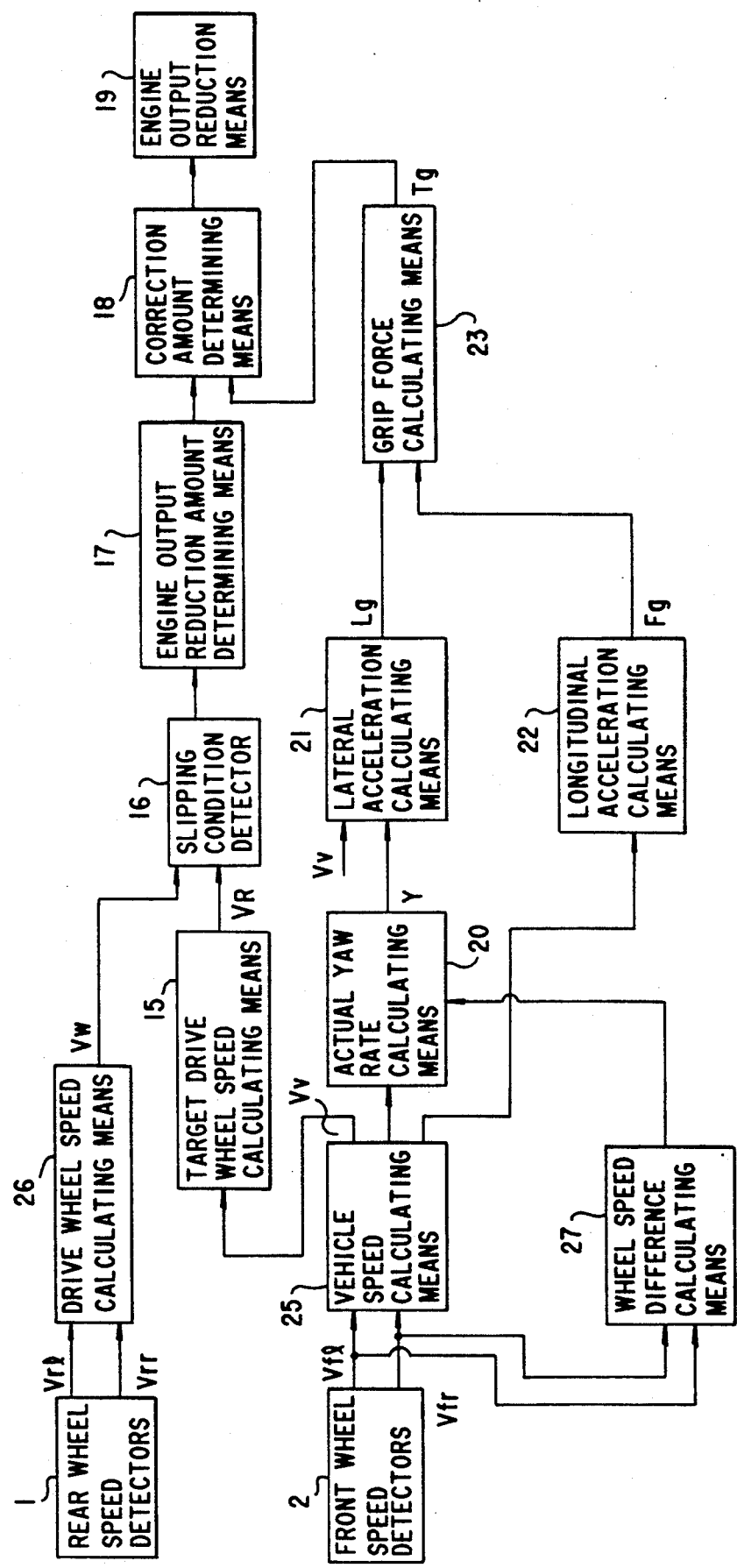

A second embodiment according to the invention will next be described with reference to FIGS. 3B and 4.

This embodiment differs from the foregoing first embodiment in the function of the correction amount determining means 18. According to this embodiment, a minimum throttle opening degree THMIN indicative of a non-load condition of the engine is applied to the correction amount determining means 18 as a function of the number of engine revolution and thereafter is corrected thereat so as to increase by the amount of increase in throttle opening degree UPTH which is determined corresponding to the magnitude of total grip force Tg outputted from the grip force calculating means 23, thus providing a modified minimum throttle opening degree THMIN'.

$$THMIN' = THMIN + UPTH$$

Figure 4:
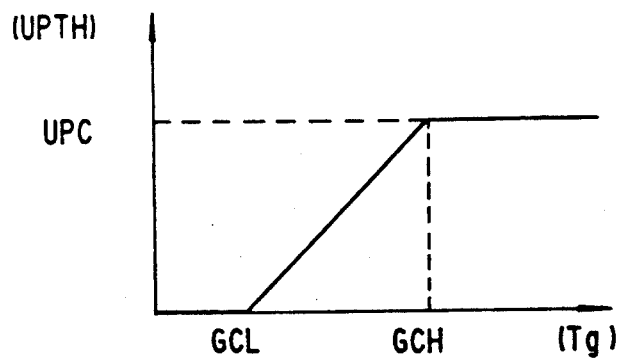

The afore-mentioned amount of increase in throttle opening degree, UPTH, is set such that it becomes 0 when the total grip force Tg is less than a lower limit GCL as shown in FIG. 4 and becomes a constant value UPC when the force Tg exceeds an upper limit GCH, and it increases linearly when the force Tg is in a range between the lower and upper limits.

In case of the feedback control of throttle opening, a signal indicative of the target throttle opening degree THINH is outputted from the engine output reduction amount calculating means 17 similarly as the first embodiment of FIG. 3A and when the target throttle opening degree THINH is lower than the afore-mentioned modified minimum throttle opening degree THMIN', the modified degree THMIN' is assumed to be the target degree THINH.

$$THINH < THMIN' > THINH = THMIN'$$

On the other hand, when the target degree THINH is higher than the modified minimum degree THMIN', the target degree THINH is used as it is as follows:

$$THINH > THMIN' > THINH = THINH$$

Thus, according to this second embodiment, the minimum throttle opening degree THMIN is modified in the increasing direction in response to an increase in the total grip force Tg to become a modified minimum throttle opening degree THMIN' and the throttle valve 8 is subjected to a feedback control so that the target throttle opening degree THINH may always exceed the modified minimum throttle opening degree THMIN'. Consequently, when the grip force of the drive wheels Wrl, Wrr or the friction coefficient of the road surface is large, the amount of reduction of engine torque to be caused by traction control is modified to become smaller, enabling a sporty travel of the vehicle.

A third embodiment according to the invention will be explained hereinafter by reference to FIGS. 5 to 8.

Figure 5:
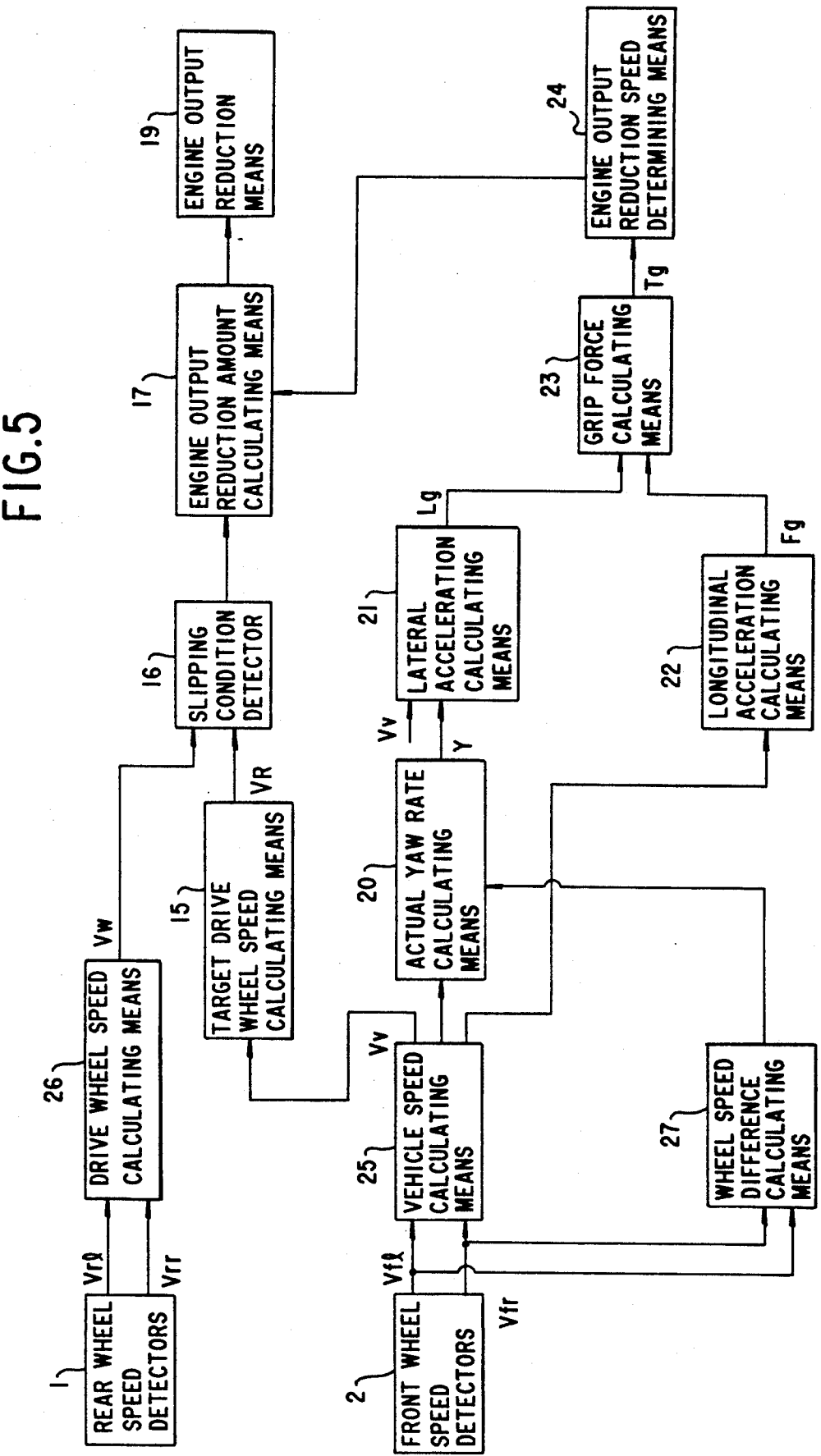

As will be apparent from FIG. 5, this embodiment includes an engine output reduction speed determining means 24 instead of the correction amount determining means 18 employed in the first and second embodiments. The engine output reduction speed determining means 24 operates to change the speed of throttle feedback control conducted at the engine output reduction amount calculating means 17 based on the output signal from the grip force calculating means 23 and more specifically this means 24 generates an output which serves to change control gains $K_{THP}$, $K_{THI}$ and $K_{THD}$ for PID control as throttle feedback control described in detail in connection with FIG. 3A, dependent on various driving circumstances and on the grip force.

Figure 6:
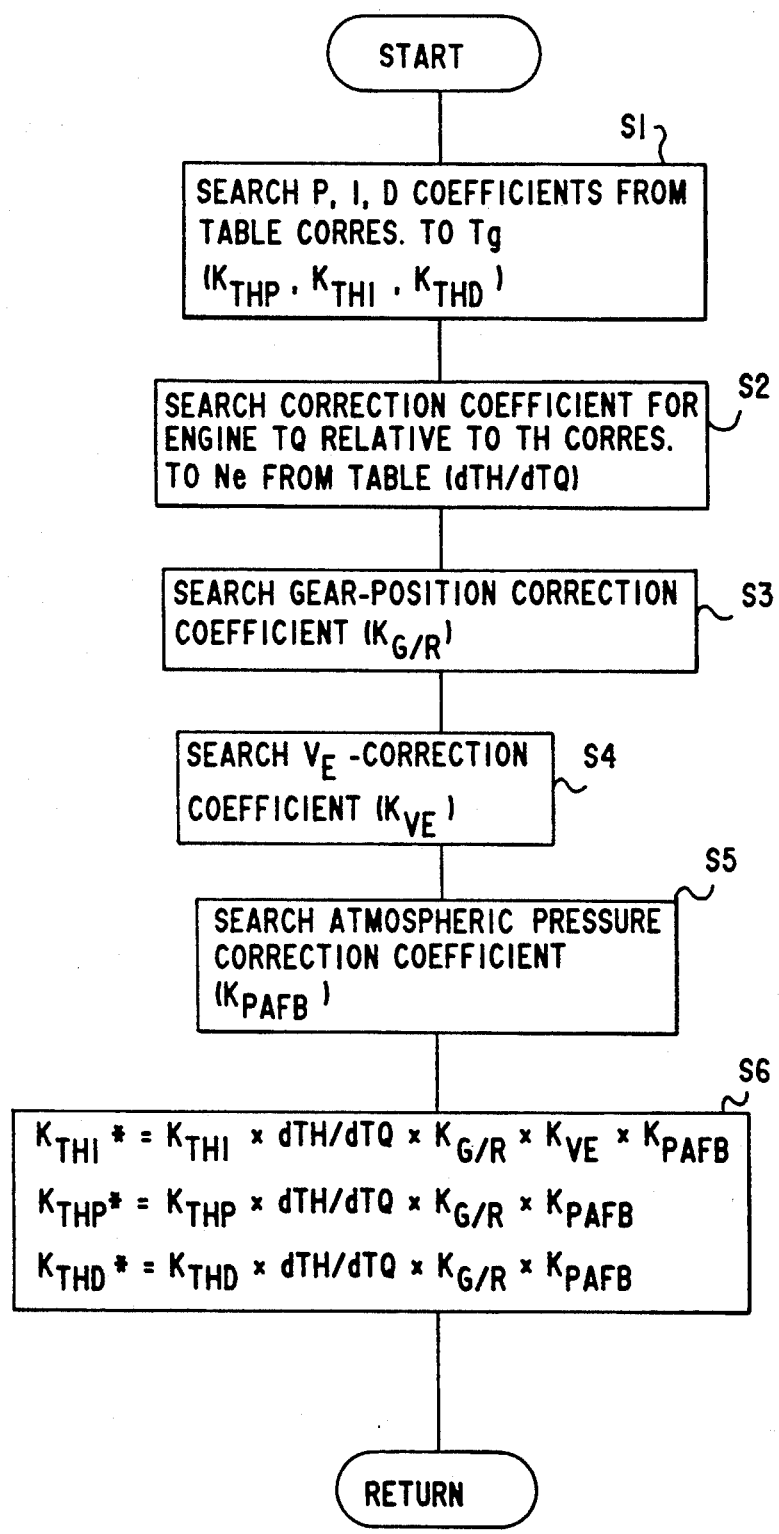

FIG. 6 is a flow chart showing the content of control performed at the engine output reduction speed determining means 24.

In this flow chart, first at step S1, control gains $K_{THP}$, $K_{THI}$ and $K_{THD}$ are searched for respective P, I and D coefficients from a table stored in the read-only-memory 11 of the electronic control unit U in correspondence to the magnitude of total grip force Tg. Namely, when the grip force calculating means 23 indicates a value of high grip condition, these control gains become small (that is, the control speed is low) and the converging speed of slipping condition of the drive wheels is delayed to keep the drive wheel slipping condition in a prolonged period, permitting a sporty vehicle travel. On the other hand, when the total grip force Tg is small, that is, in a low grip condition, larger values are selected for the control gains thereby to allow a swift converging control of the drive wheel slipping condition.

Figure 7:
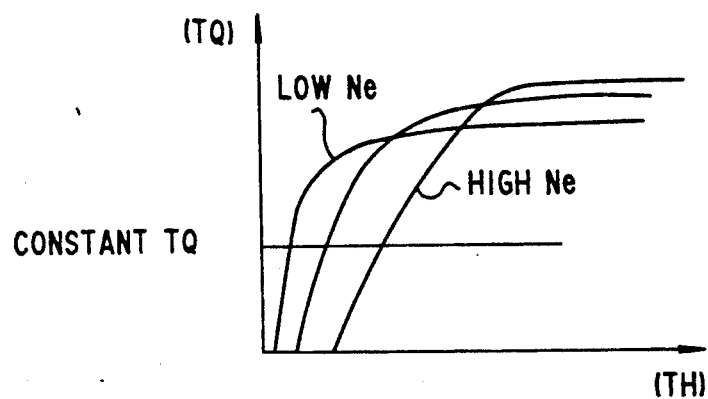
Figure 8:
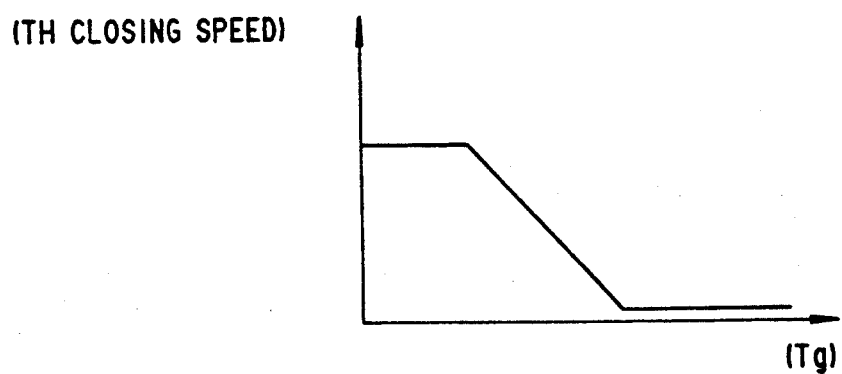

Next at step S2, a correction coefficient dTH/dTQ for the engine torque TQ corresponding to the throttle opening degree TH is searched from a table on the basis of the rotational speed Ne of the engine E outputted from the rotational speed detector 3. This correction is conducted in order to make constant the amount of reducing the drive wheel torque relative to the slip condition detected by the slipping condition detector 16, in view of the fact that the variation in engine output torque which is caused when changing the opening degree of throttle valve 8 by unit angle changes in response to an increase in the rotational speed Ne of engine E, as shown in FIG. 7. Next, the gear position is corrected at step S3 in such a manner that a gear-position correction coefficient $K_{G/R}$ is searched from a table for correcting the rate of increase of the rotational speed Ne based on the gear ratio G/R. At the next step S4, a $V_E$-correction coefficient $K_{VE}$ is searched on the basis of a deviation $V_E$ between the actual drive wheel speed Vw and the target drive wheel speed $V_R$ (or $\Sigma V_E$). This $V_E$-correction coefficient $K_{VE}$ serves to correct control gains in case there cannot be obtained a necessary and sufficient vehicle speed, such as when the initial output torque of engine E does not meet a certain value at the time of starting a feedback control or when the friction coefficient of road surface increases abruptly. At step S5, an atmospheric pressure correction coefficient $K_{PAFB}$ is searched for correcting the engine torque in view of the atmospheric pressure based on a signal from the atmospheric pressure detector 9. At step S6, corrected control gains $K_{THP^*}$, $K_{THI^*}$ and $K_{THD^*}$ are obtained using the afore-mentioned correction coefficients. Owing to these control gains $K_{THP^*}$, $K_{THI^*}$ and $K_{THD^*}$, the speed of closing of the throttle valve 8 is controlled dependent on the magnitude of total grip force Tg, that is, on the magnitude of the grip force of drive wheels Wrl, Wrr or of the friction coefficient of road surface in such a manner that the closing speed becomes slow when such magnitude is large, as shown in FIG. 8.

In consequence, it is avoided to restrict the drive wheel torque excessively during traction control in a high grip condition, thereby not only enabling a sporty travelling but also improving the steering feeling since the amount of reduction of the drive wheel torque can change continuously in response to increase and decrease in the grip force.

Figure 9:
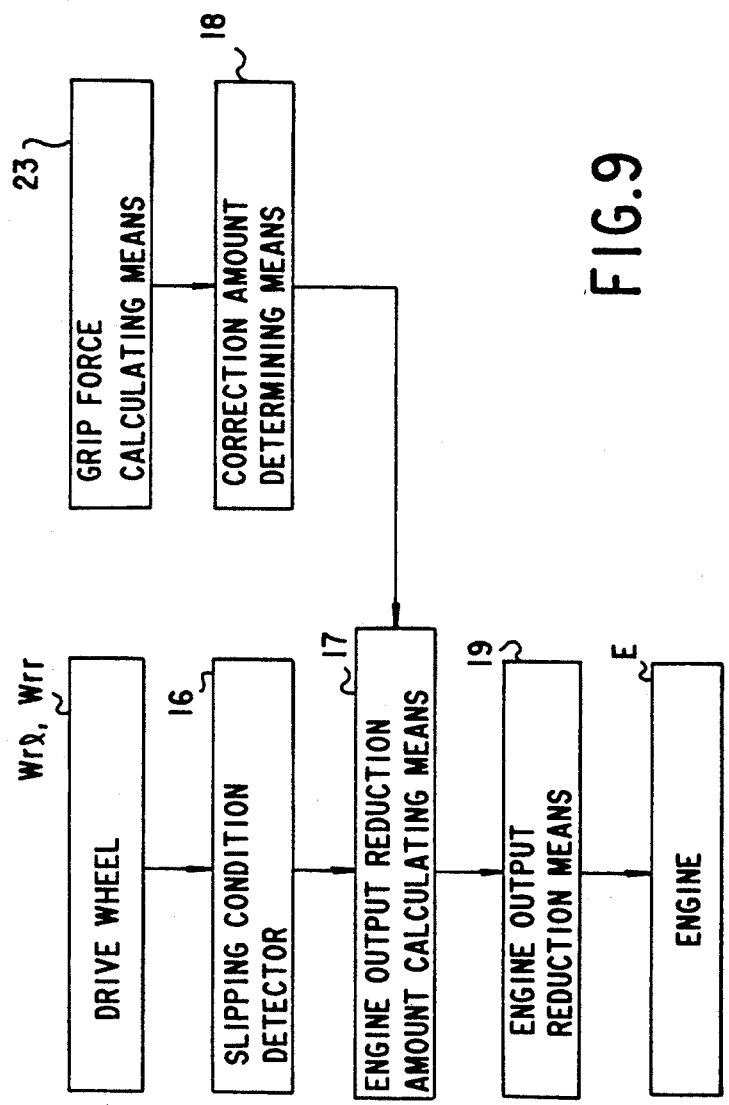
FIGS. 9 and 10 are block diagrams showing control procedures according to the first and second embodiments and to the third embodiment, respectively.
Figure 10:
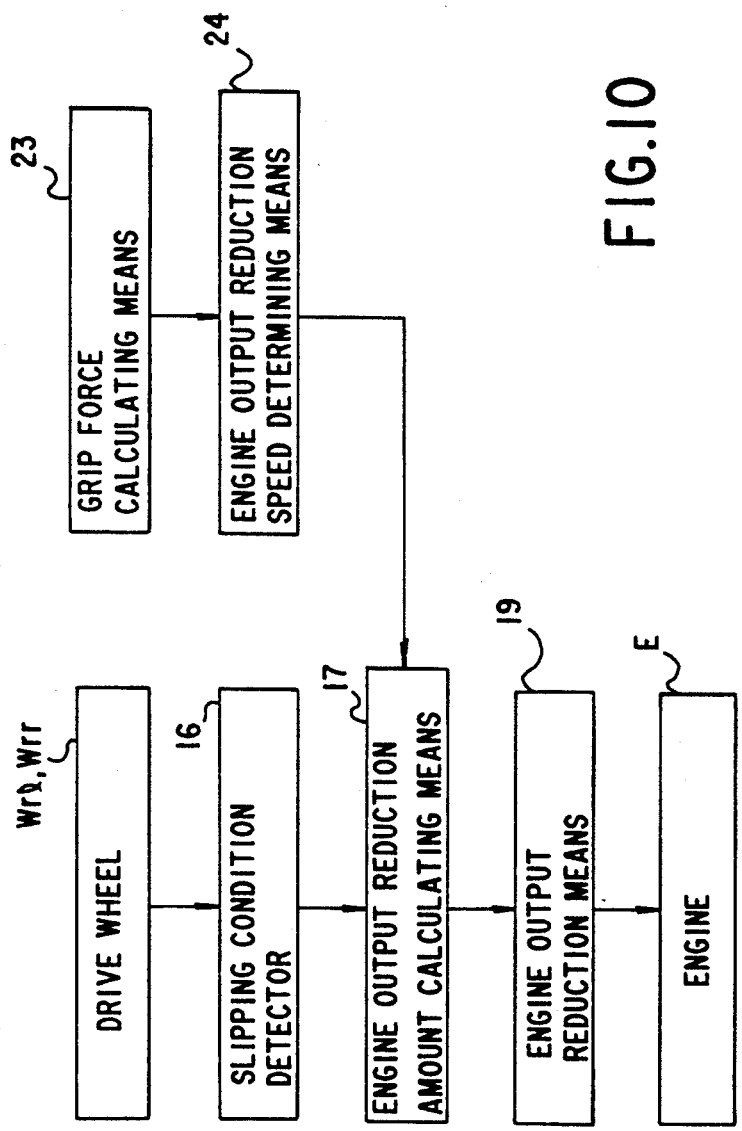

FIG. 9 schematically shows the controlling procedure according to the above-mentioned first and second embodiments whereas FIG. 10 shows the controlling procedure according to the third embodiment.

Incidentally, it should be noted in these embodiments that the grip force calculating means should not be limited to the illustrated one of calculating the total grip force Tg based on both the longitudinal acceleration Fg and the lateral acceleration Lg but may instead be constructed such that it only calculates the longitudinal acceleration of a vehicle.

Moreover, in these embodiments, the drive wheel speed Vw and the vehicle speed Vv can be obtained in any other, arbitrary, conventional manner.

Figure 11:
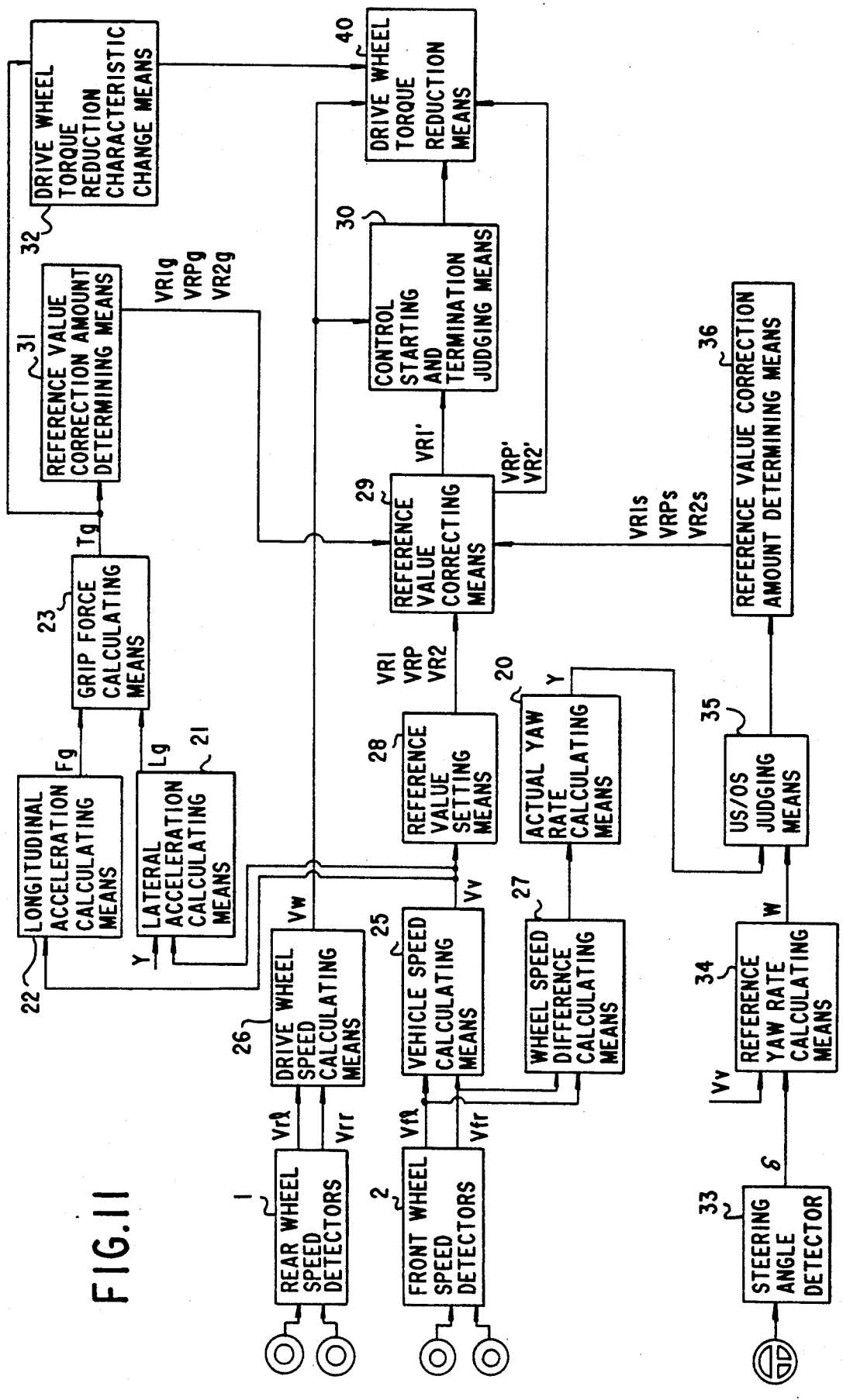
Figure 12:
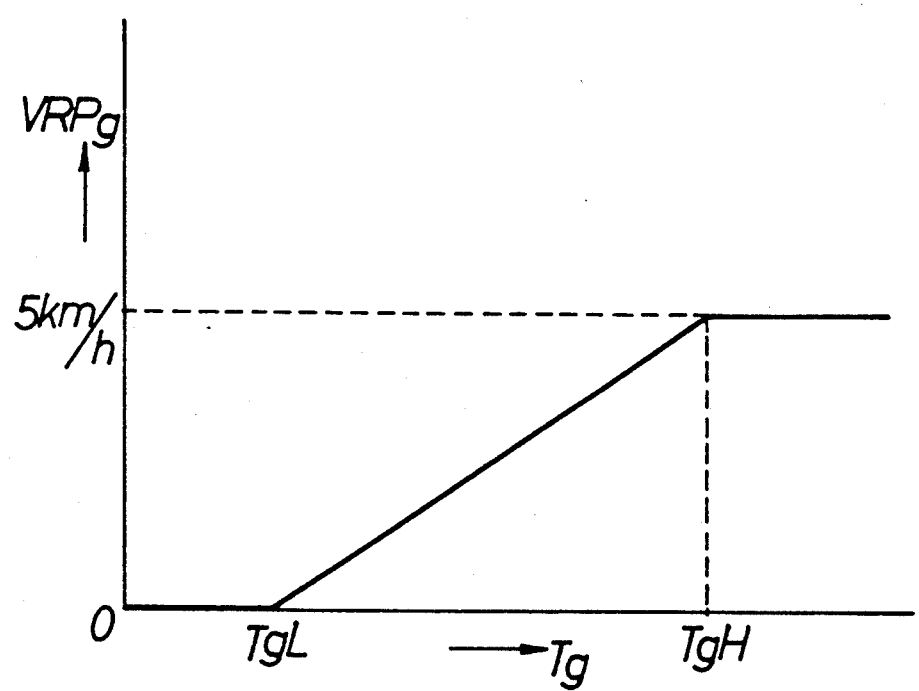

FIGS. 11 and 12 show a fourth embodiment according to this invention wherein the vehicle speed Vv calculated by the vehicle speed calculating means 25 is inputted to a reference value setting means 28 which indicates a reference value for slipping condition of the drive wheels. The reference value setting means 28 carries out operations according to the following equations (6), (7) and (8) to obtain a first reference speed VR1, a target reference speed VRP and a second reference speed VR2 dependent on the vehicle speed Vv inputted to said means 28:

$$VR1 = K_3 \times Vv \tag{6}$$

$$VR2 = K_p \times Vv \tag{7}$$

$$VRP = K_4 \times Vv \tag{8}$$

Here, $K_3$, $K_p$ and $K_4$ are constants having a relationship of $K_3 < K_p < K_4$ therebetween and therefore provide a relationship of $VR1 < VRP < VR2$.

In the above equations (6), (7) and (8), the first reference speed VR1 indicates a reference speed for causing the slip control for drive wheels to start such as by means of reducing the output of an engine when the drive wheel speed exceeds said reference speed; the target reference speed VRP indicates a drive wheel speed at which an appropriate slip rate of the drive wheels is obtained; and the second reference speed VR2 indicates a reference speed which is controlled so as to cause the engine to output a minimum power, for example, on the assumption that the drive wheel slip rate becomes excessively large when the drive wheel speed reaches this reference speed. In performing these operations, it is also possible to detect the road condition simultaneously and, when the road surface is judged to be bad which makes a drive wheel slippage difficult to occur, to set the afore-mentioned constants $K_3$, $K_p$ and $K_4$ at respective larger levels as compared with the case of travelling on a normal road surface.

The first reference speed VR1, target reference speed VRP and second reference speed VR2 set at the reference value setting means 28 are inputted to a reference value correcting means 29 at which these reference speeds are modified in a manner to be described later in accordance with the grip condition of tires and the steering condition of a vehicle. A modified first reference speed VR1' obtained as a result of modification at the reference value correcting means 29 and the drive wheel speed Vw obtained at the drive wheel speed calculating means 26 are inputted to a control starting and termination judging means 30 which operates and feeds an order to a drive wheel torque reduction means 40, which corresponds to the engine output reduction means 19 of the foregoing embodiments, for starting the drive wheel slip control when the drive wheel speed Vw exceeds the modified first reference speed VR1'. The drive wheel torque reduction means 40 is inputted with a modified target reference speed VRP' and a modified second reference speed VR2' from the reference value correcting means 29 and the drive wheel speed Vw from the drive wheel speed calculating means 26 in addition to an output signal generated from the control starting and termination judging means 30. In order that the drive wheel speed Vw may converge toward the target reference speed VRP', the drive wheel torque is subjected to a feedback control in the form of PID control wherein a deviation between the drive wheel speed Vw and the modified target reference speed VRP', an integrated value of that deviation and a drive wheel acceleration $\Delta Vw$ are multiplied by control gains Kp, Ki and Kd, respectively. The drive wheel torque reduction means 40 may include means to control the output torque of an engine like the foregoing embodiments or means to control the braking force for the vehicle. The former control means may further be constructed so as to limit the amount of fuel supply to the engine or the amount of intake air thereto or to delay the ignition timing of the engine by certain angle. The latter control means may reduce a hydraulic pressure fed to a brake.

Next description will be made as to how the first reference speed VR1, target reference speed VRP and second reference speed VR2 are modified according to the grip condition of tire.

The total grip force Tg obtained at the grip force calculating means 23 is inputted to a reference value correction amount determining means 31 at which the amount of correction for the first reference speed VR1, target reference speed VRP and second reference speed VR2 is determined on the basis of the total grip force Tg. More specifically, as shown in FIG. 12, it is arranged that the amount of correction, VRPg, for the target reference speed VRP becomes 0 when the total grip force Tg is lower than its lower limit TgL, it becomes a constant value (for example, 5 km/h) when the total grip force Tg is higher than its upper limit TgH and it increases linearly in a range between the lower and upper limits TgL and TgH for facilitating calculation. This correction amount may, however, be set so as to increase non-linearly between the limits in order to meet the tire characteristic and the like. In this embodiment, the correction amount VR1g for the first reference speed VR1 and the correction amount VR2g for the second reference speed VR2 are also set equal to the correction amount VRPg for the target reference speed VRP, that is, in a range of 0 to 5 km/h, for example. However, it may instead be arranged that the correction amounts VR1g, VRPg and VR2g are separately provided for the three reference speeds, if necessary.

The correction amounts VR1g, VRPg and VR2g established at the reference value correction amount determining means 31 are inputted to the reference value correcting means 29 at which the first reference speed VR1, target reference speed VRP and second reference speed VR2 are corrected dependent on the amount of increase in the total grip force Tg of tire. Thus, the reference values have initially been set in correspondence to the condition of a low grip force whereby the vehicle is kept from fishtailing or having the rear end slide from side to side even when it is started and accelerated under a low grip condition and once the grip force is judged to become higher, the reference speeds are changed to higher ones and so a good accelerating performance is assured.

Furthermore, a signal indicative of the total grip force Tg obtained at the grip force calculating means 23 is inputted to a drive wheel torque reduction characteristic change means 32 and this change means 32 then supplies feedback control gains Kp, Ki and Kd to the drive wheel torque reduction means 40 for providing a controlling speed appropriate for the current grip force level. In other words, when the grip force is low, small gains are supplied because of a large delay in the inertia of drive wheels restoring to its original level after the drive wheel torque has been reduced. To the contrary, when the grip force is high, large gains are generated.

Description will next be made of correction of the first reference speed VR1, target reference speed VRP and second reference speed VR2 in accordance with the steering condition.

A steering angle detector 33 equipped to a steering wheel detects a steering angle δ which is inputted to a reference yaw rate calculating means 34 along with the vehicle speed Vv outputted from the vehicle speed calculating means 25. A US/OS judging means 35 receives a reference yaw rate W outputted from the reference yaw rate calculating means 34 and an actual yaw rate Y generated from the actual yaw rate calculating means 20 and this US/OS judging means operates to judge, on the basis of a difference between both yaw rates W and Y, whether a vehicle is in understeered state or in oversteered state, and also judge the degree of deviation of the actual yaw rate Y from the reference value W. Then, at a second, reference value correction amount determining means 36 which is separate from the afore-mentioned first, correction amount determining means 31, three correction amounts VR1s, VRPs and VR2s for correcting the first reference speed VR1, target reference speed VRP and second reference speed VR2 in accordance with the steering condition of the vehicle are determined. These correction amounts VR1s, VRPs and VR2s are established in such a manner that in a rear wheel drive vehicle, for example, they serve to increase the drive wheel torque when an understeering tendency occurs during steering operation but to reduce the drive wheel torque when an oversteering tendency occurs, thereby preventing the vehicle from turning and directing in an undesired direction.

The operation of this embodiment will next be described.

On the basis of the vehicle speed Vv fed from the vehicle speed calculating means 25, the reference value setting means 28 establishes three reference values: a first reference speed VR1 for causing starting of slip control of the drive wheels when the drive wheel speed Vw exceeds this reference speed; a target reference speed VRP showing a drive wheel speed Vw of such a level as providing an appropriate slip rate; and a second reference speed VR2 for causing the drive wheel torque to become a minimum level on the assumption that the slip rate of drive wheels becomes excessively large when the drive wheel speed Vw reaches this reference speed VR2. The reference value correcting means 29 effects corrections to the first reference speed VR1, target reference speed VRP and second reference speed VR2 using the correction amounts VR1g, VRPg and VR2g determined based on the total grip force Tg of drive wheels and also using the correction amounts VR1s, VRPs and VR2s determined in accordance with the understeered or oversteered condition of a vehicle, according to the following equations:

$$VR1' = VR1 + VR1g + VR1s$$

$$VRP' = VRP + VRPg + VRPs$$

$$VR2' = VR2 + VR2g + VR2s$$

If the drive wheel speed Vw exceeds the corrected first reference speed VR1' as corrected in the reference value correcting means 29, the control starting and termination judging means 30 operates and generates an order to cause the drive wheel torque reduction means 40 to start the drive wheel slip control operation and then the drive wheel torque is controlled so as to bring the drive wheel speed Vw into convergence toward the corrected target reference speed VRP' between the corrected first and second reference speeds VR1' and VR2' such as by means of increasing and decreasing the engine output torque or increasing and decreasing the braking force. As a result, an excessive slippage of the drive wheels is avoided to assure a proper slip rate.

Figure 13:
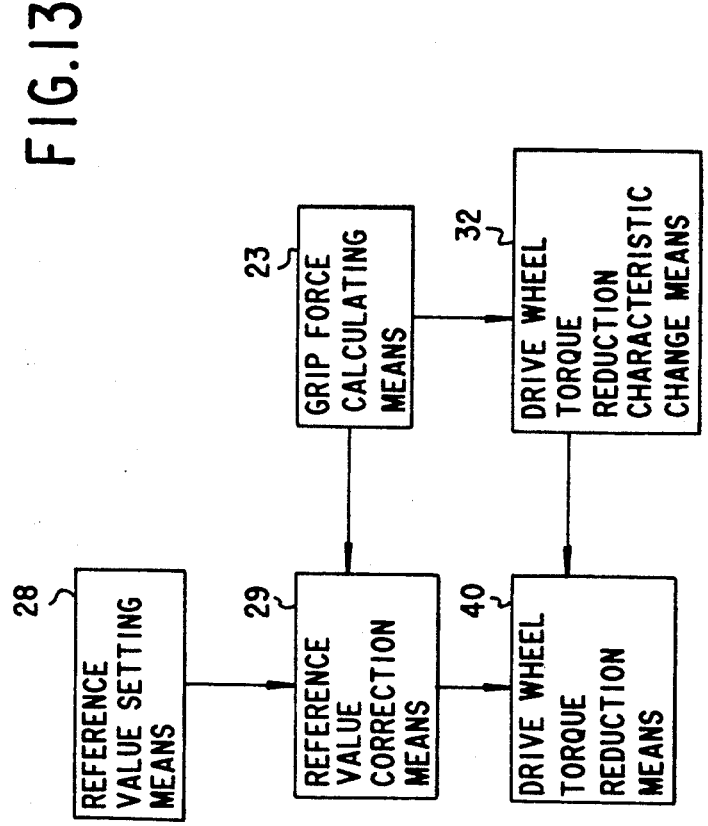

FIG. 13 is a diagram which schematically shows the controlling procedure according to this fourth embodiment.

As has been described, when the total grip force Tg of a tire is changed dependent upon the travelling condition of the vehicle or the kind of the tire, control is effected to raise the reference value for the slippage of drive wheels in response to increase in the total grip force Tg, there is obtained a sporty travel without disturbing the slip control function for the drive wheels.

It should incidentally be noted that it is not necessary to carry out a control of correcting the first, target and second reference speeds VR1, VRP and VR2 in accordance with the steering condition, that is, an understeered condition or an oversteered condition, but some of the speeds may be deleted from the controlled values. Moreover although the target reference speed is used as a reference value for the slippage of drive wheels in this fourth embodiment, it may not be limited thereto but may be modified such that the slip rate of the drive wheels and a reference value are instead used and/or the acceleration of the drive wheels and a reference acceleration are used. Moreover, although in this embodiment the reference value is corrected on the basis of the total grip force, it may instead be arranged that the reference value can be returned to an original value in accordance with a certain time function after it has reached a maximum level through a series of correcting operation.

What is claim is:

1. A drive wheel slip control system for a vehicle, comprising a slipping condition detector for detecting a slipping condition of a drive wheel, an engine output reduction amount calculating means for calculating an amount of reduction of an engine output based on a signal outputted from the slipping condition detector, an engine output reduction means for reducing the engine output based on a signal from the engine output reduction amount calculating means, a grip force calculating means for calculating a grip force for the drive wheel based on longitudinal acceleration and a lateral acceleration of the vehicle, and a correction amount determining means for correcting said amount of reduction of the engine output calculated at the engine output reduction amount calculating means on the basis of an output signal from the grip force calculating means.

2. The system according to claim 1, wherein the correction of the amount of reduction of the engine output is a correction of a target drive wheel speed.

3. The system according to claim 1, wherein the correction of the amount of reduction of the engine output is a correction of a minimum engine output.

4. The system according to claim 1, wherein said grip force is calculated based on the longitudinal acceleration and the lateral acceleration of the vehicle using the following equation:

$$Tg = \sqrt{Fg^2 + Lg^2}$$

where Tg is said grip force; Fg is the longitudinal acceleration; and Lg is the lateral acceleration.

5. A drive wheel slip control system for a vehicle, comprising a slipping condition detector for detecting a slipping condition of a drive wheel, an engine output reduction amount calculating means for calculating an amount of reduction of an engine output based on a signal outputted from the slipping condition detector, an engine output reduction means for reducing the engine output based on a signal from the engine output reduction amount calculating means, a grip force calculating means for calculating a grip force for the drive wheel based on a longitudinal acceleration and a lateral acceleration of the vehicle, and an engine output reduction speed determining means for reducing a speed of the reduction of said engine output performed by said engine output reduction means on the basis of an increase in the level of a signal outputted from the grip force calculating means.

6. The system according to claim 5, wherein said grip force is calculated based on the longitudinal acceleration and the lateral acceleration of the vehicle using the following equation:

$$Tg = \sqrt{Fg^2 + Lg^2}$$

where Tg is said grip force; Fg is the longitudinal acceleration; and Lg is the lateral acceleration.

7. A drive wheel slip control system for a vehicle, comprising a reference value setting means for setting a reference value for slippage of a drive wheel which allows an appropriate slip condition, a drive wheel torque reductio means for reducing a torque of the drive wheel when the slip condition of the drive wheel exceeds the reference value, a grip force calculating means for calculating a grip force for the drive wheel based on a longitudinal acceleration and a lateral acceleration of the vehicle, and a reference value correcting means for correcting said reference value dependent on an output from the grip force calculating means.

8. The system according to claim 7, wherein said grip force is calculated based on the longitudinal acceleration and the lateral acceleration of the vehicle using the following equation:

$$Tg = \sqrt{Fg^2 + Lg^2}$$

where Tg is said grip force; Fg is the longitudinal acceleration; and Lg is the lateral acceleration.

9. A drive wheel slip control system for a vehicle, comprising a reference value setting means for setting a reference value for slippage of a drive wheel which allows an appropriate slip condition, a drive wheel torque reduction means for reducing a torque of the drive wheel when the slip condition of the drive wheel exceeds the reference value, a grip force calculating means for calculating a grip force for the drive wheel based on a longitudinal acceleration and a lateral acceleration of the vehicle, and a drive wheel torque reduction characteristic change means for changing a relationship of the amount of reduction of drive wheel torque effected by the drive wheel torque reduction means with respect to the slipping condition dependent on the grip force obtained at the grip force calculating means.

10. The system according to claim 9, wherein said grip force is calculated based on the longitudinal acceleration and the lateral acceleration of the vehicle using the following equation:

$$Tg = \sqrt{Fg^2 + Lg^2}$$

where Tg is said grip force; Fg is the longitudinal acceleration; and Lg is the lateral acceleration.

* * * * *

UNITED STATES PATENT AND TRADEMARK OFFICE
CERTIFICATE OF CORRECTION

PATENT NO. : 5,172,319
DATED : December 15, 1992
INVENTOR(S) : Shuji Shiraishi et al It is certified that error appears in the above-identified patent and that said Letters Patent is hereby corrected as shown below:

On the cover page, Item [75], inventor's first name "Osamo" should read --Osamu --.

Signed and Sealed this

Seventh Day of December, 1993

Attest:

BRUCE LEHMAN

*Attesting Officer*     *Commissioner of Patents and Trademarks*